United States Patent [19]
Trietley, Jr.

[11] 4,201,088
[45] May 6, 1980

[54] DIFFERENTIAL MEASURING SYSTEM
[75] Inventor: Harry L. Trietley, Jr., Yellow Springs, Ohio
[73] Assignee: Yellow Springs Instrument Company, Inc., Yellow Springs, Ohio
[21] Appl. No.: 966,261
[22] Filed: Dec. 4, 1978
[51] Int. Cl.² ............................................. G01K 7/16
[52] U.S. Cl. ................................ 73/342; 73/362 AR; 73/362.5; 323/75 N
[58] Field of Search ............... 73/342, 362 AR, 362.4, 73/362.5, 362.6; 323/75 N

[56] References Cited
U.S. PATENT DOCUMENTS
3,347,098  10/1967  Bielstein .................................. 73/342

FOREIGN PATENT DOCUMENTS
2710782  9/1978  Fed. Rep. of Germany ............. 73/342

Primary Examiner—Donald O. Woodiel
Attorney, Agent, or Firm—Biebel, French & Nauman

[57] ABSTRACT

An apparatus for measuring the differential between a plurality of physical quantities, such as temperature, includes transducers 10 and 12 each positioned to sense the physical quantity. The transducers are preferably of the resistive or nonreactive variety. A single, controlled current power source 15 is connected sequentially to the transducers through a switching circuit 20. Each transducer is connected to the switching circuit and to an amplifier 40 through four-conductor cables 35, 45. The amplifier is therefore connected continuously to the transducers to sense both the voltage developed thereacross when the transducer is connected to the source of current through the switching circuit and also to sense continuously any other voltages, such as those that might be produced by thermocouple effects. The output of the amplifier 40 is applied to a linearizing circuit 50 whose output is used to control the magnitude of the output current of the current source 15 in response to the absolute resistance of each transducer. The switching circuit 20 is controlled by a clock 30 the output of which also controls a synchronous demodulator 55 which is connected to the output of the amplifier means for sampling the peak-to-peak output of the amplifier after all transients have decayed.

6 Claims, 6 Drawing Figures

DIFFERENTIAL MEASURING SYSTEM

BACKGROUND OF THE INVENTION

This invention relates to an instrument for measuring the difference between two physical quantities using electrical sensing transducers.

More particularly, this invention relates to the use of transducers which do not generate voltage or current by themselves, but transducers which require the application of an external source of electrical power, and the voltage developed across or the current flowing through the transducers is detected and used as a measure of the quantity measured, such as temperature, pressure or some other physical quantity which affects the resistance, reactance or other characteristic of the transducer. Generally, such transducers are non-linear devices.

The most common means of measuring the differential between two quantities is to use a resistive or reactive electrical bridge where the transducers form two legs of that bridge. By carefully matching the fixed components, the bridge output can be made to represent closely the difference between the quantities sensed by the transducers; and the output can represent, in some cases, the linear equivalent of the difference detected by the transducers over some narrow range. In some devices, feedback from the output of the bridge is used to modify the bridge exitation current to provide linearization. The effects of lead wire resistance are reduced in some instruments by the use of compensating loops in the transducer connections.

Although the use of an electrical bridge minimizes error due to inbalance in the measurement circuitry, there are limits in the accuracy and in the range over which linearization of the instrument can be maintained. All of these instruments are susceptible of lead wire resistance, as none permit true four-wire measurement of the transducer's outputs. Direct current energized bridges will produce undesirable outputs due to thermocouple effects in the transducer connections. All require both transducers to be energized simultaneously, and this is a serious limitation in power-limited systems.

Another common means of measuring the difference between two transducers includes amplifying, scaling and linearizing the output signal of each transducer separately and then electrically subtracting one amplified signal from the other. Such devices may be designed to provide any degree of linearization required, and may use true four-wire measurements to eliminate errors due to lead wire resistance. These systems require careful matching and close temperature tracking of the two amplifying, scaling and linearizing means in order to avoid large errors in the measured difference signals. Also, direct current energized instruments remain sensitive to thermocouple effects, and all systems require that both transducers be energized simultaneously.

In the measurement of low level direct current signals, such as those produced by the transducers described above, chopper stabilized amplifiers may be used to minimize errors caused by direct current offset voltages and other currents found in the amplifiers; however, chopper stabilization does not reduce sensitivity to thermocouple effects generated in the connection between the transducers and the connecting cables.

SUMMARY OF THE INVENTION

This invention relates to an apparatus for measuring the differential between two quantities, such as temperature, including a circuit using a single power source to supply power to a pair of transducers or temperature sensing elements and means for linearizing the output signal therefrom.

In the preferred embodiment of the invention, a single, controlled current power source is connected through switching means and through cable means alternately to the transducers or temperature sensing elements which are preferably of the resistive or nonreactive variety. An amplifier is connected continuously, also through cable means, to the transducers to sense both the voltage developed thereacross when it is connected to the source of current and also to sense continuously any other voltages, such as those produced by thermocouple effects.

The output of the amplifier may be and is preferably connected to a linearizing circuit which, in one form is a device to control the magnitude of the current flow through each transducer in response to the voltage developed across that transducer.

Solid state gate circuits may be used to switch the source of current between the two transducers under the direction of a clock. The output of this clock may also be connected to a synchronous demodulator connected between the output of the amplifier and the indicating means. The demodulator includes means for sampling the peak-to-peak output of the amplifier after all transients have decayed so that its output represents accurately the differential measurement or temperature between the transducers.

This invention therefore provides a unique means of minimizing differential errors due to inbalance in the measurement circuitry, while at the same time improving transducer linearization, and eliminating errors due to lead-wire resistance and thermocouple effects in the transducer connections. Further, errors due to direct current offset voltages and currents in the measurement amplifiers are minimized. The power supply exitation current is half that required for prior art devices.

It is therefore an object of this invention to provide an apparatus for measuring the differential between a plurality of physical quantities, including a plurality of transducers for sensing the physical quantities, a single, controlled power source, switching means for connecting said power source sequentially to said transducers, amplifier means, means for connecting said transducers to said switching means and to said amplifier means, said amplifier means having inputs connected to said transducers through said connecting means for measuring continuously a signal developed by said transducers and said connecting means, and output circuit means connected to the output of said amplifer means for indicating the differential between the physical quantities sensed by said transducers.

Other objects and advantages of the invention will be apparent from the following description, the accompanying drawings and the appended claims.

DESCRIPTION OF THE PREFERRED EMBODIMENT

Figure 1:
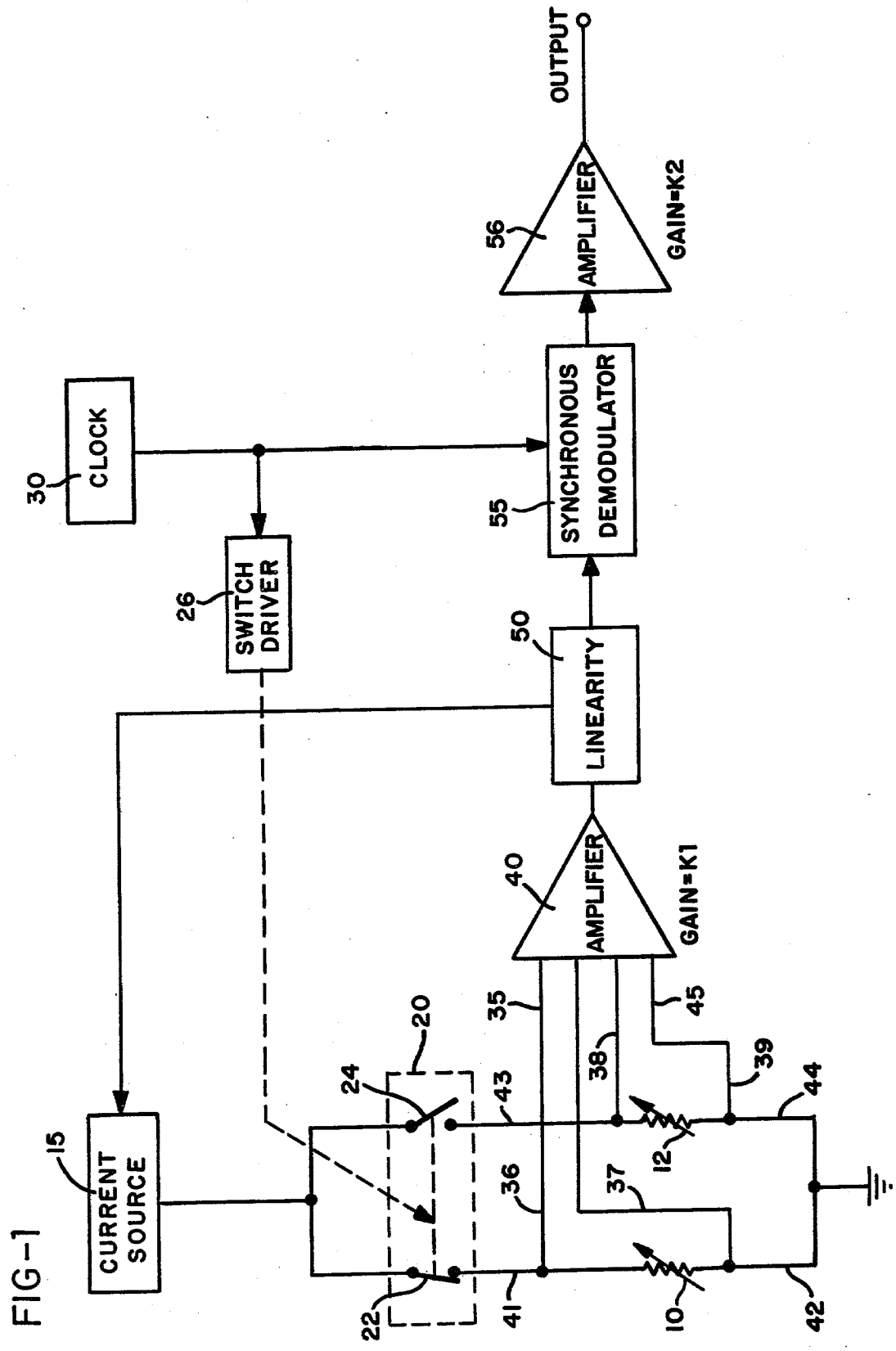
FIG. 1 is a simplified electrical block diagram of the invention.

Referring now to the drawings which show a preferred embodiment of the invention, and particularly to the electrical block diagram of FIG. 1, an apparatus for measuring the differential between two measured quantities, such as temperature, includes a plurality of transducers 10 and 12 connected to a single substantially constant, but controlled, current power source 15 through switch means 20 which includes a first switch 22 and a second switch 24. The switches in the preferred embodiment of the invention are solid state devices activated by a switch driver 26 under the control of a clock 30. The clock 30 provides control pulses which drive the switch driver to open and close the switches 22 and 24 and thereby connect the transducers 10 and 12 alternately to the current source 15.

Cable means 35 connects transducer 10 to the switch means 20, to circuit common and to an amplifier 40. The cable means 35 includes a first pair of wires 41, 42 connected to either side of the transducer 10, and a second pair of wires 36, 37 also connected to either side of transducer 10. Transducer 10 is connected to the switch 22 by wire 41, to circuit common through wire 42, and to amplifier 40 by wires 36 and 37. Likewise, cable means 45 includes a first pair of wires 43, 44 connected to either side of transducer 12 and a second pair 38, 39 also connected to either side of transducer 12. Transducer 12 is connected to the switch 24 by means of wire 43, to circuit common by means of wire 44, and to amplifier 40 through wires 38 and 39. Thus, a true four-wire measurement system is employed to allow independent placement of each transducer and thus allow each transducer to measure a physical quantity without passing current through the same wires that sense the voltages developed during the measurement interval.

Connected to the output of amplifier 40 is a linearizing circuit means 50, one output of which is connected to the current source 15. The circuit means 50 therefore senses the magnitude of the output of the amplifier 40 and provides a control signal which controls the magnitude of the current output of the current source 15. The linearizing circuit 50 may be any function generator which modifies the output of the amplifier 40 in an inverse function to the nonlinear characteristics of the transducers 10 and 12.

The amplifier 40 is connected continuously through the cable means 35 and 45 to each of the transducers, and therefore it will measure the voltage developed across each transducer as it is connected to the source of current by means of the switching means 20, and also will sense any other voltages developed in the transducers, the cable means, or the interconnection between the transducers and the cables, such as might be caused by thermocouple effects.

The nonlinear compensating circuit 50 is designed to provide an inverse function of the nonlinear characteristic of the transducers 10 and 12. Amplifiers having unity voltage gain to act as buffers may be inserted in each of wires 36, 37, 38 and 39 to present a high impedance to the transducers to minimize the current drawn from the transducers, thereby reducing possible loading errors. The amplifiers can add a possible source of measurement error because they may not be exactly matched, and for this reason, these amplifiers are not normally used except where special conditions dictate.

Another output of the linearizing circuit means 50 is connected to a synchronous demodulator shown generally at 55. The synchronous demodulator also has an input to it from the clock 30. The synchronous demodulator samples the peak-to-peak output of the amplifier 40 after all transients have decayed so that a true measurement of the quantity is made. The output of the synchronous demodulator is applied to an output circuit means including amplifier 56, the output of which represents the difference in the measurement made by the transducers 10 and 12.

In the preferred embodiment of the invention, the transducers 10 and 12 normally do not produce any output voltage on their own, except perhaps an undesired voltage which might be developed due to thermocouple effects. Primarily, the sensing of the measured quantity, such as temperature, is accomplished by exciting the transducers with current from the current source 15, and measuring the resistance, reactance, or some other electrical quantity of the transducer, and using the transducer voltage as a measure of the unknown quantity.

Figure 2:
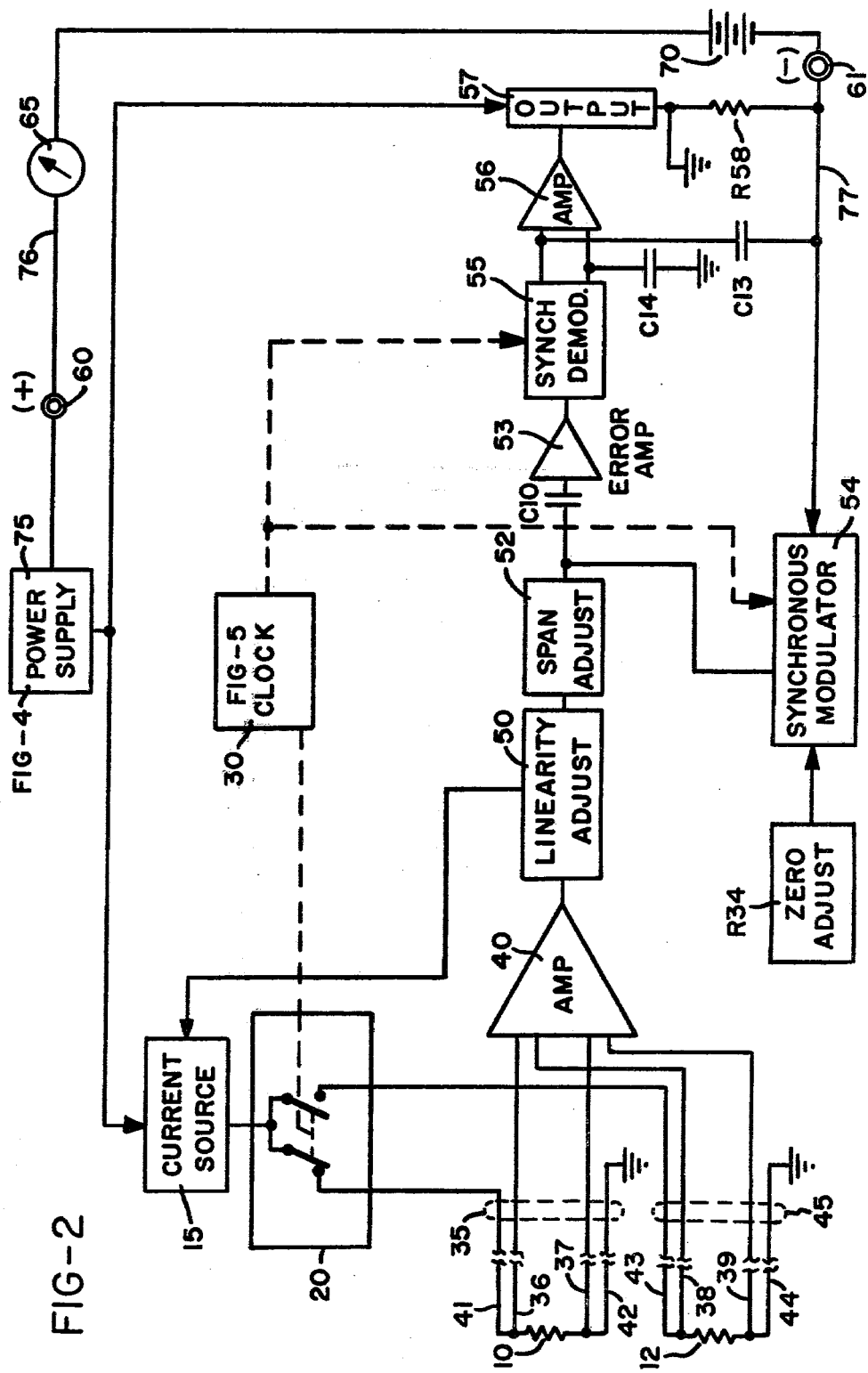
FIG. 2 is an electrical block diagram showing a preferred embodiment of the invention.

Referring now to FIG. 2, which is an electrical block diagram of the preferred embodiment of the invention, it will be noted that the same reference numerals have been used on corresponding components.

The instrument has output terminals 60 and 61 which are connected through a current readout device or milliameter 65 to a power source 70. The (+) terminal 60 is connected to the power supply circuit 75, shown in detail in FIG. 4. This power supply provides regulated voltage outputs which provide energy to the remainder of the circuitry.

All of the current flowing through the circuitry flows through resistor R58, and through the (−) terminal 61 to the other side of the 24 volt power source 70. Therefore, only two wires are necessary to supply power to the instrument. In other words, the instrument is merely one part of a series circuit which also includes the power source 70 and the current readout device 65.

Also in FIG. 2, an output of the linearity adjustment means 50 is connected to a span adjust circuit 52 which scales the output for use by the remainer of the circuitry. The output of the span adjust and the output of a synchronous modulator 54 are connected to a capacitor C10 which, in turn, is connected to an error amplifier 53. The synchronous modulator alternately connects a zero adjustment voltage representative of the desired zero offset and a voltage representative of the ultimate measurement output to the error amplifier under the control of clock 30. The output of the error amplifier is connected to the synchronous demodulator 55, and its output is directed through a differential integrater 56 to the output circuit 57.

Figure 3:
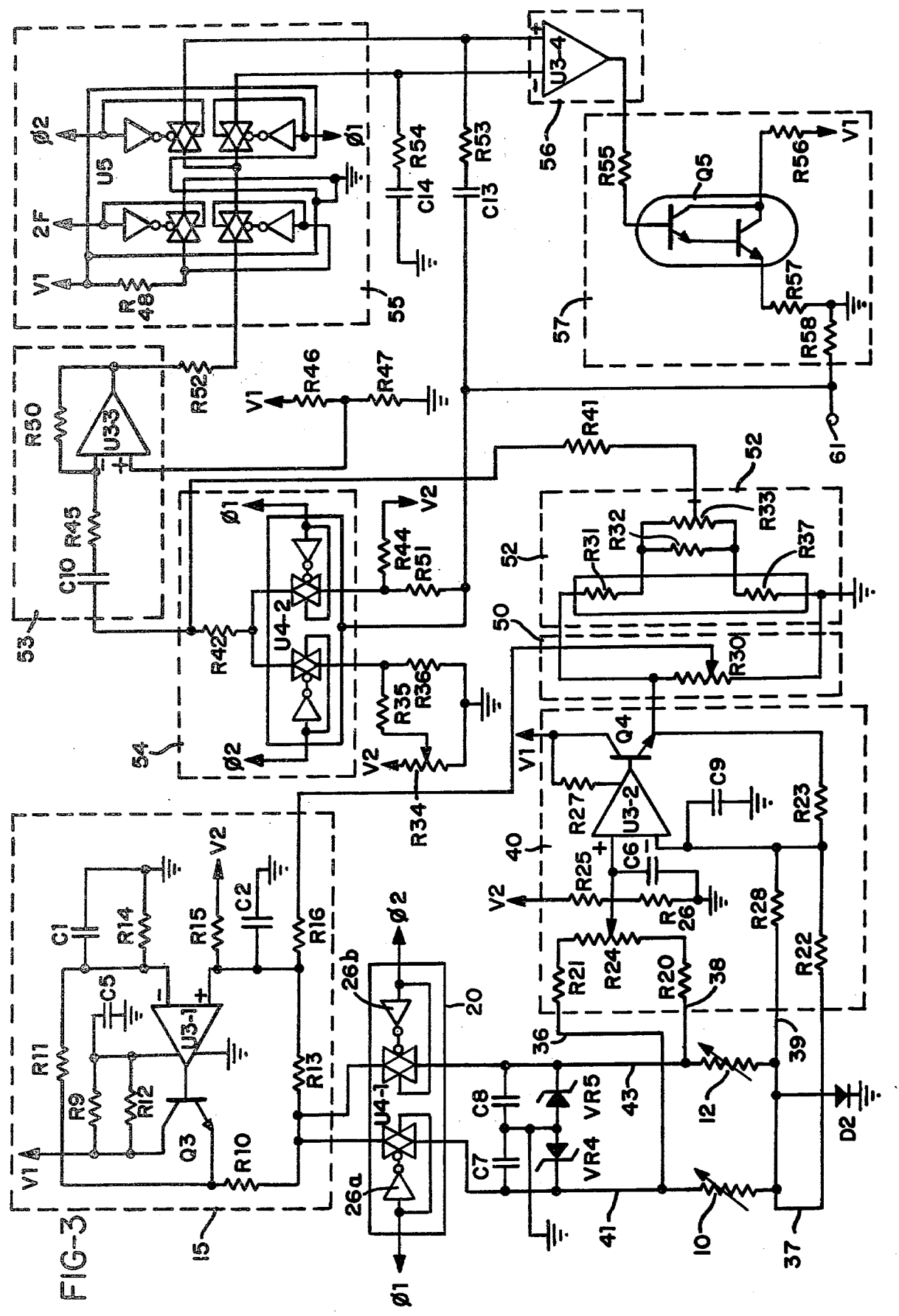
FIG. 3 is an electrical schematic diagram showing a preferred embodiment of the invention.

Referring now to FIG. 3, which is a detailed schematic of a preferred embodiment of this invention, the constant current source 15 includes a transistor Q3 connected between a source of voltage V1 and the switching means 20. The current passes through resistor R10 and develops a voltage drop which is fed back to the inputs of amplifier U3-1 via resistors R11, R14, R13, R15 and R16. Amplifier U3-1 responds to these inputs and controls the base of transistor Q3 so as to maintain a constant current therethrough in spite of any variations in the voltage of source V1 or in the resistance of transducers 10 and 12. The magnitude of the current is proportional to a fixed reference voltage V2 and the voltage on the slider of potentiometer R30.

The switching means 20 consists of an integrated circuit U4-1 including switching devices driven by switch drivers 26A and 26B under the control of the clock 30 shown in FIG. 2. The switch means 20 therefore connects the single constant current, by controlled power source 15 alternately to the transducers 10 and 12.

The transducers 10 and 12 are preferably resistance temperature detectors, the resistance of which increases as the temperature sensed by the transducer increases. Since the output of the current source 15 is constant, then the voltage developed across each transducer will also increase in direct proportion to resistance. However, as the temperature increases, the transducers will lose sensitivity, and therefore there is not a direct proportionality between temperature and voltage, and in other words the transducers are nonlinear devices which act in a predictable manner, and their nonlinearity can be compensated for by means of the linearizing circuit means 50, as will be explained.

Transducer 10 is connected to switching means 20 by wire 41, to diode D2 by wire 42, and to the amplifier circuit 40 by means of wires 36 and 37. Transducer 12 is connected to switching means 20 by means of wire 43, to diode D2 by wire 44, and to the amplifier 40 by means of wires 38 and 39. Thus, the transducers can be placed independently of each other and the remainder of the measuring apparatus.

Amplifier means 40 includes an integrated circuit amplifier U3-2, output transistor Q4, and resistors R20-R23, and R25-R28, and potentiometer R24 in an arrangement similar to a commonly known differential amplifier. Resistors R21 and R22 form one differential input connected to transducer 10 by means of wires 36 and 37, while resistors R20 and R23 provide a second differential input connected to transducer 12 by means of wires 38 and 39.

Potentiometer R24 is adjusted to compensate for any mismatch between R20 and R21, so that the voltages developed by the two transducers are amplified equally. Resistors R25 and R26 form a voltage divider network between reference voltage V2 and circuit common, placing a positive bias voltage on one input of amplifier U3-2. The constant current flowing through diode D2 places a positive bias on both inputs of amplifier U3-2, so that the input levels are within the amplifier's operating limits.

The transducers are connected to the input of the amplifier means 40. Since a transducer will not develop an output voltage related to its resistance in the absence of exitation current from the current source 15, any other voltages which might be present can be assumed to be due to thermocouple effects generated within the transducer, in the cable or wires connected to transducer, or in the interconnection between the transducers and the cable.

These voltages produce a constant direct current voltage at the output of amplifier means 40 which is independant of the current flowing through transducers 10 or 12. Additional constant direct current outputs are caused by the input bias voltages, and by offset voltages and currents in amplifier U3-2.

When switching means 22 is closed and 24 open as directed by clock 30 and switch driver 26, the current from the constant current source 15 flows through transducer 10, developing a voltage proportional to the transducer's resistance. Likewise, when switching means 24 is closed and 22 open, the current flows through transducer 12 and produces a voltage proportional to that transducer's resistance. These voltages are amplified by amplifier means 40 and added to the constant direct current output. Thus, as switching means 22 and 24 are alternately opened and closed under the control of clock 30 and switch driver 26, the output of amplifier means 40 alternates between two voltages representative of the resistances of the two transducers. The difference between these two levels is proportional to the difference between the two transducers' voltages, and is independent of the constant direct current output level.

In the preferred embodiment transducers 10 and 12 are resistance temperature detectors whose resistances increase with temperature. It is a characteristic of such transducers that, as the temperature increases, their sensitivity decreases. Thus, it is desirable to increase the magnitude of the constant current source as their resistance increases. The voltage at the slider of R30, which is proportional to the output of amplifying means 40, is connected to resistor R16 of the constant current source 15 in such a way as to cause this to happen. By properly adjusting R30 it is possible to compensate closely for the nonlinearity of the resistance temperature detectors over a wide range of temperatures.

As transducers 10 and 12 are alternately energized by switching means 20, the output of amplifying means 40 and the voltage at the slider of potentiometer R30 represent alternately the resistance of first transducer 10, then transducer 12. As the voltage at the slider changes, the current source is changed to the proper current for the particular transducer being energized. Thus, the current through each transducer is set to the optimum value for its particular temperature and yet, each transducer is energized, measured, amplified and linearized by the same circuitry. There is no source of differential measurement error in the circuitry, except for the possible misadjustment of potentiometer R24.

In the preferred embodiment of FIG. 3, the output of amplifying means 40 is scaled by a span or gain adjustment network 52 including resistors R31, R32 and R37 and potentiometer R33. The scaled output is then fed through resistor R41 and direct current decoupling capacitor C10, to an error amplifying means 53 including amplifier U3-3, gain setting resistors R45 and R50 and bias setting resistors R46 and R47.

A synchronous modulating means 54, including integrated circuit switching means U4-2, under the control of the clock, alternately connects resistor R42 to a first voltage proportional to the ultimate measurement output and to a second zero adjustment voltage. The first voltage is generated as the output current signal flows through resistor R58. This voltage is connected to a bias network including resistors R44 and R51 which is, in turn, connected to one of the switches in U4-2. The second voltage is a fixed direct current voltage determined by potentiometer R34 and resistors R35 and R36. The output of the synchronous modulator thus alternates between one voltage representative of the ultimate output current and a second voltage representative of the desired zero offset. This output is connected to the error amplifying means 53 via resistor R42 and direct current decoupling capacitor C10.

The output of the error amplifying means 53 is connected through resistor R52 to a synchronous demodulator 55 including integrated circuit switching means U5 and resistor R48. U5 is connected to and under the control of the clock. One section of U5 is connected to the "2F" clock signal and to resistor R48, and functions as a logic signal inverter. The other three sections function as solid state switches.

The two outputs of the synchronous demodulator 55 are connected to resistor-capacitor networks C13—R53 and C14—R54 and to amplfier U3—4. These components form an integrator 56, which integrates any different between the two demodulator outputs. R53 and R54 are low value resistors whose purpose is to limit the energy available in case the capacitors are accidentally discharged in an explosive atmosphere. The output of the integrator is connected via resistor R55 to an output stage 57 including transistor Q5 and resistors R56, R57 and R58.

In normal use, transducer 10 generally has a resistance not less than transducer 11. Also, the voltage representative of the output is generally no greater than the zero offset voltage. The switching means 20 and the synchronous modulator 54 are connected to the two clock outputs identified as "$\phi$" and "$\phi 2$" in such a way that (1) when "$\phi 1$" is high, the output of amplifier 40 corresponding to transducer 10, and the output of modulator 54, representative of the output are connected to the error amplifier 53 while (2) when "$\phi 2$" is high the error amplifier 53 is presented with voltages corresponding to transducer 11 and the zero offset from the network including R34–R36. The synchronous demodulator 55 is connected to the clock such that when "$\phi 1$" is high the output of error amplifier 53 is connected to R54–C14 while when "$\phi 2$" is high, the output of the error amplifier is connected to R53–C12.

When the output current is at the proper level, the alternating current voltage output of modulator 54 will be such as to counterbalance the alternating current output of amplifying means 40. When this occurs the input to, the output of, the error amplifier will be a constant direct current level. The two outputs of the synchronous demodulator 55 will be equal, the voltages on capacitors C13 and C14 will remain steady and the output will not change.

If the output current is not at the proper level, the alternating current voltage output of modulator 54 will not counterbalance the alternating current voltage output of amplifier 40, an error signal will be developed and the demodulator outputs during times "$\phi 1$" and "$\phi 2$" will be unequal. This will cause capacitors C13 and C14 to charge or discharge, changing the output of the integrator 56 which, in turn, will change the current output. This will continue until the output is such that the output of modulator 54 reaches the desired level and once again counterbalances the output of amplifier 40.

In a practical system, transducers 10 and 11 and their connecting wires will contain capacitive or inductive reactance. Also, the amplifiers will generally have a finite response time to a sudden change of their input signals. For these reasons, the various signals in the measuring system will not reach their proper values until some time after the clock outputs "$\phi 1$" and "$\phi 2$" have switched. If the demodulator 55 is connected the output of the error amplifier 53 to the integrator 56 as soon as the clock switched, erroneous outputs would result.

Figure 5:
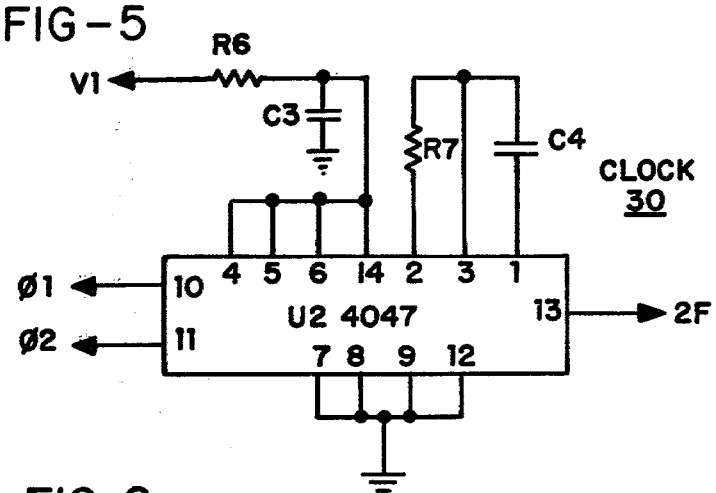
FIG. 5 is an electrical schematic diagram showing a clock circuit suitable for use with the circuit of FIG. 3.
Figure 6:
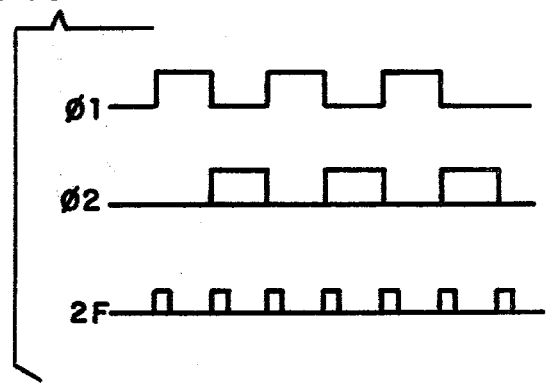
FIG. 6 is a waveform diagram showing the output of the clock circuit of FIG. 5.

As shown in FIGS. 5 and 6, these outputs are available from the clock; the above-mentioned "$\phi 1$" and "$\phi 2$" outputs and a third output, labeled "2F." The synchronous demodulator 55 is connected to the "2F" output such that the connection between the error amplifier 53 and the integrator 56 is made only while "2F" is low. Thus, all transient responses in the transducers and the amplifiers will have ended by the time the connection is made.

In the preferred embodiment capacitors C1, C2, C6, and C9 reduce the circuit's susceptibility to interference from radiated electromagnetic fields such as may be generated by nearly radio transmitters. Zener diodes VR4 and VR5 and capacitors C7 and C8 safely dissipate surge currents such as might be induced in the transducer cables during nearby lightning storms.

Figure 4:
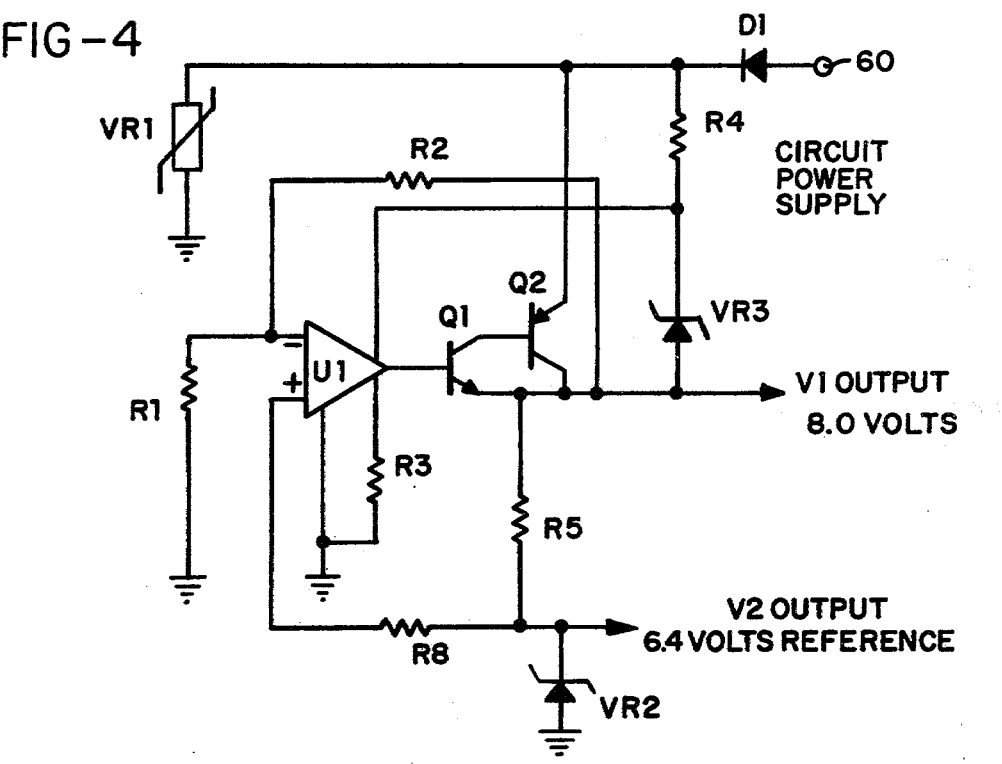
FIG. 4 is an electrical schematic diagram of a power supply suitable for use with the circuit of FIG. 3.

Referring now to the power supply 25 of FIG. 4, the basic reference source is determined by Zener diode VR2. The current to energize that Zener diode comes through resistor R5 from transistors Q1 and Q2 which in turn are controlled by the output of amplifier U1. Resistors R1 and R2 feed back the output of the transistors to one of the inputs of the amplifier U1. The feedback is such as to make the two inputs to the amplifiers equal, which is the balanced condition. When this occurs, then the output from the transistors Q1 and Q2 has been adjusted such as to make the V1 output level to 8.0 volts, assuming that the Z2 Zener diode voltage is 6.4 volts.

The 8.0 volts output on terminal V1 then becomes the basic power supply for the instrument. The 6.4 volts output on terminal V2 is a precision low temperature coefficient voltage which is used as a reference for the current source 15 and other components of the instrument. Resistor R5 controls the amount of current that flows through the Zener diode VR2. Varistor VR1 is a surge suppressor which protects the instrument circuitry against surges on the two output wires 76 and 77 such as might be caused by a nearby lightning storm. Diode D1 protects the circuit against damage in case of accidental reverse polarity connections. Resistor R4 and Zener diode VR3 provide a properly biased positive supply voltage to the amplifier U1. Resistor R3 biases amplifier U1 into proper operation.

The clock shown in FIG. 5 is simply an integrated circuit U2 using R7 and C4 to determine its frequency. R6 and C3 comprise a filter placed between the clock and the power supply so that switching spikes generated inside the clock integrated circuit are not fed into the rest of the instrument via the power supply connecting wires.

The following table identifies the values and type of components employed in a preferred embodiment of the invention.

| TABLE OF COMPONENTS | | | |
|---|---|---|---|
| Resistors (in ohms) | | | |
| R1 | 2M, 1% | | |
| R2 | 499K, 1% | R30 | 100K, 10% |
| R3 | 10M, 10% | R31 | 154K*, 1% |
| R4 | 33K, 10% | R32 | 12.4K, 1% |
| R5 | 1.7K, 1% | R33 | 50K, 10% |
| R6 | 2.7K, 10% | R34 | 100K, 10% |
| R7 | 1.24M, 1% | R35 | 2.05M, 1% |
| R8 | 390K, 10% | R36 | 61.9K, 1% |

-continued

TABLE OF COMPONENTS

| | | | |
|---|---|---|---|
| R9 | 100, 10% | R37 | 13.0K*, 1% |
| R10 | 1K* 1% | R41 | 54.9K, 1% |
| R11 | 100K, 0.1% | R42 | 1M, 1% |
| R12 | 10M, 10% | R44 | 1.3M, 1% |
| R13 | 100K, 0.1% | R45 | 82.5K, 1% |
| R14 | 316K, 0.1% | R46 | 220K, 10% |
| R15 | 432K, 0.1% | R47 | 220K, 10% |
| R16 | 1.13M, 1% | R48 | 220K, 10% |
| R20 | 243K, 0.1% | R50 | 22M, 10% |
| R21 | 243K, 0.1% | R51 | 61.9K, 1% |
| R22 | 243K, 0.1% | R52 | 330K, 10% |
| R23 | 243K, 0.1% | R53 | 432, 1% |
| R24 | 500, 10% | R54 | 432, 1% |
| R25 | 4.87M, 0.1% | R56 | 150*, 10% |
| R26 | 2.1M, 0.1% | R57 | 100, 10% |
| R27 | 10M, 10% | R58 | 49.9*, 1% |
| R28 | 1.47M, 0.1% | | |

*These values selected to provide a 4 to 20 milliamp range of output current in response to a 0° to 100° C. differential input range of temperature when using Platinum RTD elements having 100 ohms resistance at 0° C.

| Capacitors | | Diodes | |
|---|---|---|---|
| C1 | 100 pf | D1 | 1N459 |
| C2 | 100 pf | D2 | STB-568 (G.E.) |
| C3 | 0.022 mfd | | |
| C4 | 0.0022 mfd | Integrated Circuits | |
| C5 | 100 pf | U1 | LM 4250 (National) |
| C6 | 100 pf | U2 | CD 4047 (RCA) |
| C7 | 100 pf | U3 | LM 346 (National) |
| C8 | 100 pf | U4 | CD 4066 (RCA) |
| C9 | 100 pf | U5 | CD 4066 (RCA) |
| C10 | 0.22 mfd | | |
| C13 | 1 mfd | Transistors | |
| C14 | 1 mfd | Q1 | MPSA-43 (Motorola) |
| | | Q2 | MJE 350 (Motorola) |
| Voltage Regulators | | Q3 | 2N5089 |
| VR1 | V150ZA1 (G.E.) | Q4 | 2N5089 |
| VR2 | 6.4V, 1N4572 | Q5 | MPSA-13 (Motorola) |
| VR3 | 6.2V SZ6.2 (Schauer) | | |
| VR4 | 1N5245A | | |
| VR5 | 1N5245A | | |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Apparatus for measuring the differential between a plurality of physical quantities, including
   a plurality of transducers for sensing the physical quantities,
   a single, controlled power source,
   switching means for connecting said power source sequentially to said transducers,
   amplifier means,
   means for connecting said transducers to said switching means and to said amplifier means,
   said amplifier means having inputs continuously connected to said transducers through said connecting means for measuring continuously a signal developed by said transducers and any other signals developed in said transducers and said connecting means, and
   output circuit means connected to the output of said amplifier means for indicating the differential between the physical quantities sensed by said transducers.

2. Apparatus for measuring the differential between a plurality of physical quantities, including
   a plurality of transducers for sensing the physical quantities,
   a single, controlled power source,
   means for connecting said power source sequentially to said transducers,
   amplifier means,
   cable means for connecting said transducers to said connecting means and to said amplifier means,
   said amplifier means having inputs connected to said transducers through said cable means for measuring continuously a signal developed by said transducers and other signals developed in said transducers and said cable means,
   means for modifying the magnitude of the output of said power source in response to the output of said amplifier means to linearize the output of said amplifier means, and
   output circuit means connected to the output of said amplifier means for indicating the differential between the physical quantities sensed by said transducers.

3. Apparatus for measuring the differential between two physical quantities including
   first and second transducers placed to sense said quantities,
   a constant electrical current source,
   means for connecting said current source alternately to said transducers,
   amplifier means,
   cable means for connecting said transducers to said connecting means and said amplifier means,
   said amplifier having its inputs continuously connected to said transducers through said cable means to amplify continuously the voltage developed across each of said transducers as said current source is connected thereto and any other voltages developed in said transducers and said cable means, and
   means connected to the output of said amplifier means for indicating the differential output of said transducers.

4. Differential temperature measuring apparatus including
   first and second temperature sensing transducers,
   a single, controlled current power source,
   means for connecting said current source alternately to said temperature sensing transducers,
   cable means connected to said temperature sensing transducers for permitting independent placement of said temperature sensing transducers,
   amplifier means having its inputs connected to said temperature sensing transducers through said cable means for amplifying continuously the voltage developed across each of said temperature sensing transducers as said current source is connected thereto and any other voltages developed in said temperature sensitive transducers and said cable means,
   means responsive to the output of said amplifier means for modifying the magnitude of the current output of said current source to linearize the output of said apparatus, and
   means connected to the output of said amplifier means for indicating the temperature differential between said temperature sensing transducers.

5. Differential temperature measuring apparatus including
   first and second temperature sensing transducers, a single, controlled current power source, clock means for providing a source of control pulses, switch means responsive to the control pulses from said clock means for connecting said current source alternately to said temperature sensing elements, cable means connected to said temperature sensing transducers to permit independent placement of said temperature sensing transducers, amplifier means connected to said temperature sensing transducers through said cable means for amplifying continuously the voltage developed across each of said temperature sensing transducers as said current source is connected thereto and any other voltages developed in said temperature sensitive transducers or said cable means, means responsive to the output of said amplifier for modifying the magnitude of the current output of said current source to linearize the output of said apparatus, synchronous demodulator means, connected to the output of said amplifier means and responsive to the control pulses from said clock means, for sampling the peak-to-peak output of said amplifier means after all transients have decayed, and means connected to the output of said synchronous demodulator means for indicating the temperature differential between said temperature sensing transducers.

6. The apparatus of claim 5 wherein said cable means includes four wires for each transducer, two wires connecting said transducer to said amplifier means, and two wires connecting said transducer to said current source.

* * * * *